Dec. 21, 1954  F. G. KONSTANDT  2,697,461
METHOD OF MAKING SPIRALS FOR HOLLOW PANEL STRUCTURES
Filed Feb. 23, 1949  2 Sheets-Sheet 1

Francisco Goldberger Konstandt  Inventor
By *L. F. Marx*  Attorney

Dec. 21, 1954   F. G. KONSTANDT   2,697,461
METHOD OF MAKING SPIRALS FOR HOLLOW PANEL STRUCTURES
Filed Feb. 23, 1949   2 Sheets-Sheet 2

Francisco Goldberger Konstandt   Inventor
By   *L. F. Mart*   Attorney

United States Patent Office
2,697,461
Patented Dec. 21, 1954

1

2,697,461

METHOD OF MAKING SPIRALS FOR HOLLOW PANEL STRUCTURES

Francisco Goldberger Konstandt, Buenos Aires, Argentina

Application February 23, 1949, Serial No. 77,951

4 Claims. (Cl. 144—309)

The present invention relates to improved multilayer panels made of wood, plastics, gypsum, paper, paperboard, metals etc. More particularly, the invention is concerned with improved panels useful in the manufacture of partitions, walls, frames, and especially hollow doors, table tops, etc.

In its more specific aspects, the present invention relates to panel structures such as hollow doors, or other hollow panels, which comprise cover plates supported on and connected to each other by spiral-shaped bodies made of wood or suitable material, as described in detail in my copending earlier application Serial Number 34,471, filed June 22, 1948, now Patent No. 2,633,439, issued March 31, 1953. The panel structures described in said earlier application broadly comprise two parallel cover plates, preferably plywood plates, separated and supported on each other by a plurality of spiral-shaped bodies edgewise arranged between the cover plates, i. e. the length axis of said members forming right angles with the principal planes of the cover plates and said edges of said members being attached, e. g. by a suitable adhesive to adjacent surfaces of the cover plates. The present invention is specifically concerned with improvements in the manufacture and shape of spiral-shaped members and the manufacture of panels of the type specified in said earlier application.

It is object of the present invention to provide means which permit the manufacture of hollow panels of the type specified above, directly from individual veneers and spiral shaped members in essentially a single operation, rather than from plywood plates which have to be manufactured in a separated preliminary process step.

Another object of this invention is to provide means permitting the manufacture of spiral-shaped members of the type specified above which in the form in which they are produced carry on their edges at least a substantial portion of the total amount of adhesive required for securing the cover plates to the edegs of the spiral-shaped members in the manner described above.

It is still another object of the present invention to provide improved means for ventilating the space between the cover plates, which is occupied by said spiral-shaped members.

A more specific object of the invention is an improved method of attaching to each other hollow panels of the type specified.

Still another object of the invention is to provide improved supporting members for cover plates of hollow panels, each of said members consisting essentially of a single shaving the two ends of which have substantially the form of annuli.

A further object of the invention is to provide an improved method for manufacturing hollow panels of increased thickness and/or improved sound-insulating properties.

Other and more specific objects and advantages of the present invention will appear from the following detailed description of the invention, in which reference will be made to the accompanying drawing wherein Figure 1 is a view of a few spirals between their outer face plates.

Figure 3:
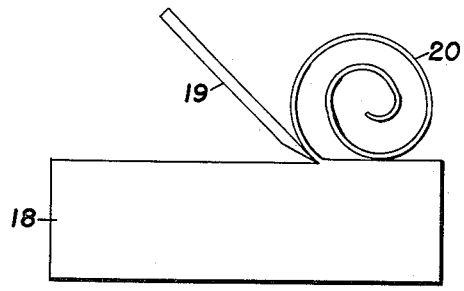
Figure 3 shows a schematic longitudinal view of a working spiral knife.
Figure 4:
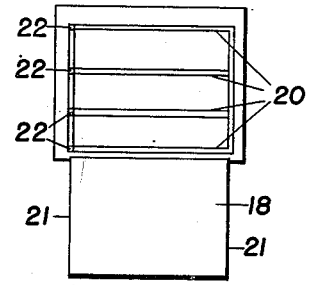

Figure 4 belongs to Fig. 3 as a cross section in axis x—x.

2

Figure 5:
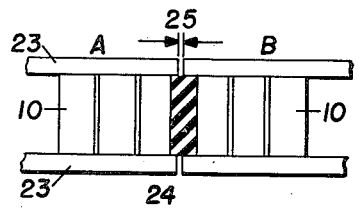

Figure 5 shows a top view of two panels A and B.

Figure 6:
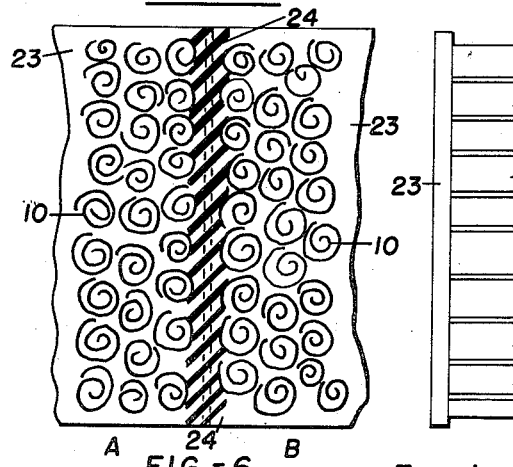

Figure 6 is a corresponding vertically section through the two panels A and B.

Figure 7:
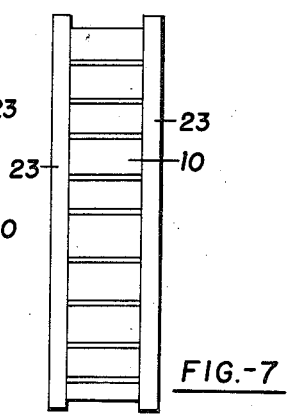

Figure 7 an end view of panels Fig. 6 in axis z—z.

Figure 8:
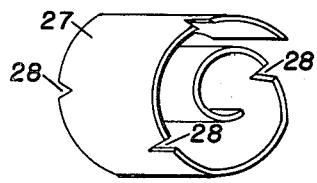

Figure 8 is a perspective view of a spiral of certain characteristics.

Figure 9:
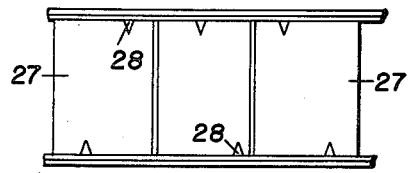

Figure 9 an end view of several spiral like Fig. 8 between the face plates.

Figure 10:
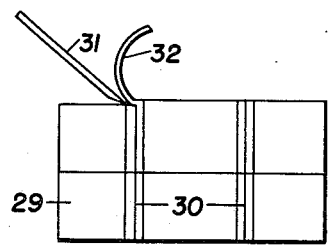

Figure 10 shows a schematic view of lumber blank and knife.

Figure 11:
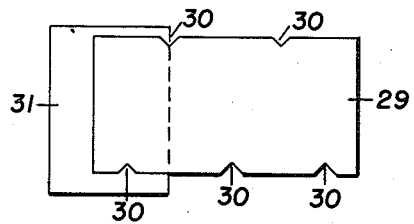

Figure 11 is the corresponding view, seen Fig. 10 from below.

Figure 12:
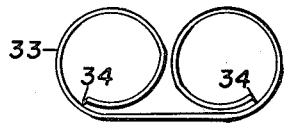

Figure 12 shows another type of structure for panels.

Figure 13:
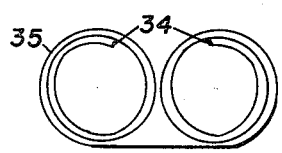

Figure 13 still another type of a double annulus.

Figure 14:
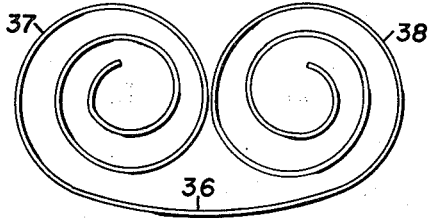

Figure 14 shows a double-spiral.

Figure 15:
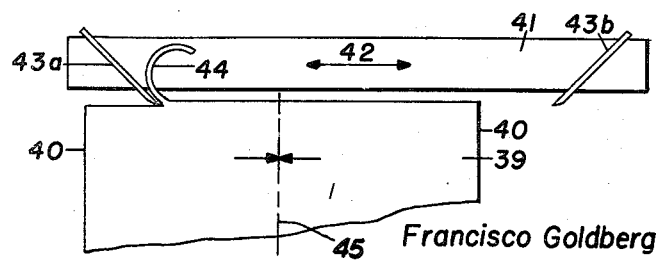

Figure 15 shows a general arrangement of the principal to manufacture double annulus or double spirals.

Figure 1:
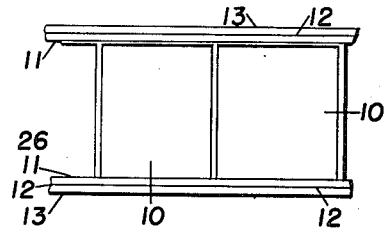

Referring now in detail to Figure 1, the reference numeral 10 identifies spiral-shaped supporting and connecting members arranged between cover or face plates to form a hollow panel of the type specified above. The face plates consist of two or more veneers 11 and 13 and adhesive layers 12 such as any suitable glue or, preferably a synthetic resin. A similar adhesive layer 26 may be applied to the inner surfaces of veneers 11. In accordance with the present invention, members 10, veneers 11 and 13 and adhesive layers 12 and 26 are loosely arranged in the relative positions indicated in Figure 1 and this loose arrangement is there after placed in a suitable press of conventional design and subjected therein to a pressure adapted to secure the individual elements 10, 11 and 13 firmly and permanently to each other, in a single operation. In the case of doors or similar structures which are finished with frames, these frames may be secured to the panels in the same single pressing operation as will be readily understood by those skilled in the art.

In this manner, the present invention permits the use of relatively inexpensive individual veneers in place of the rather expensive ready-made plywood plates which have been used almost exclusively in the manufacture of hollow panels prior to this invention.

It has been found that pressures of about 65 to 75 lbs. per sq. in. are generally sufficient to produce smooth and stable hollow panels in the manner specified above, calculated in the glue-line.

Figure 2:
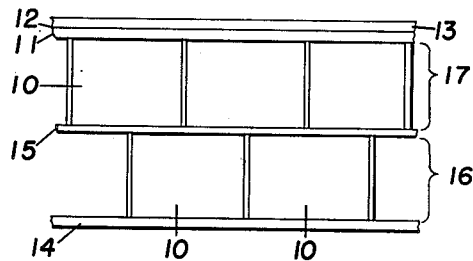
Figure 2 is a view of two rows of spirals with outer faces.

Referring now to Figure 2, there is shown a cross section through a hollow panel, the thickness of which is greater than the height of members 10. The novel feature of this panels resides in the fact that a partition 15 is arranged between two rows 16 and 17 of mmebers 10, which are confined by outer face plates 14 and 10, 13, respectively in the manner outlined in connection with Figure 1. Partition 15 may be a wood veneer, a plywood plate, a sheet of paper board, kraft paper, or any other suitable material. It has been found that no high mechanical strength is required for partition 15 because it will be subjected to minor stress only even if the panel is subjected to considerable bending forces. It will be appreciated that any desired number of rows 16, 17 may be provided substantially as indicated. Arrangements of this type afford hollow panels of increased thickness as well as of any desired thickness but greatly improved sound- and heat-insulating qualities.

Figures 3 and 4 illustrate schematically a new method of producing spiral-shaped members of the type of members 10 of Figures 1 and 2, which, in the course of their production from suitable lumber blanks, are provided on their edges with a layer of adhesive. With respect to specific details of the general process of producing spiral-shaped members of the type here involved reference is made to the earlier copending Schauer and Konstandt application Serial Number 59544, filed on November 12, 1948 wherein this process is fully described and broadly claimed. In accordance with the present invention, and as indicated in Figure 3 and 4, lumber-blank 18 is provided with adhesive layers 21 on the two opposite surfaces which will form the edges of the spiral-shaped member 20 when blank 18 is cut by the knife 19 as indicated on the drawing and more fully explained in said application Serial Number 59544. It will be understood that knife 19, in the process of producing spiral 20, simultaneously cuts the wood and adhesive layers 21 of blank 18, thus producing individual spirals 20 having edges provided with adhesive layers 22.

One of the outstanding advantages of this embodiment of the invention resides in the fact that the total surface of the spiral edges is normally less than one-tenth of the adjacent surface of a face plate or veneer to which the spiral has to be secured. Consequently, only about one-tenth of the amount of adhesive heretofore required to build a hollow panel of this type, is sufficient in accordance with this invention. Adhesive layer 21 preferably consists of a resin-type glue which is quick-drying so that blank 18 may be introduced in a dry state into the spiral-cutting machine, and which affords a strong and stable bond upon the application of heat and pressure. For example resin-glues from the American Cyanamid Co., used for the connection of veneers in their edges, are suitable for this purpose.

Figures 5 to 7 are different views of a plural hollow panel composed in accordance with another embodiment of the invention. Plural panels of this type may be manufactured as follows. Two hollow frame-less panels A and B produced substantially as described above may be connected with each other to form a unitary plural panel structure the length of which corresponds to the sum of the lengths of the individual panel elements, by putting individual elements A and B together so that their small sides touch each other with the edges of the respective face plates, as shown in a top view in Figure 5, and in a longitudinal vertical section in Figure 6. Thereafter, a readily flowing cement preparation, such as plaster of Paris, hot asphalt, or any other suitable cementing material which hardens without the liberation of water, is poured into space 24 formed between panel A and B. It is the essence of this method of composing plural panels that as a result of the irregular outline created by the plurality of spirals 10 by which space 24 is defined the hardened cement in space 24 takes on the form of a toothed rod which meshes completely with the irregularities of the panel surfaces bound together by the cement. The bond so created is extremely strong and stable.

Figures 8 to 11 illustrate schematically a novel type of spiral-shaped supporting member and a preferred method of preparing the same. Spiral 27 of Figure 8 is provided with several notches 28 which permit internal ventilation of the finished panel as indicated in Figure 9. Notches 28 which may be of any desired number, size and shape may be created as follows. The lumber blank 29 (see Figures 10 and 11) which is to be cut into spirals as described above is provided with grooves 30 corresponding in size, number and position (spacing) to those desired for notches 28 in the finished spiral 27.

Other spiral-or annular-shape supporting and spacing members and a preferred method for their production are schematically illustrated in Figures 12 to 15. Figure 12 shows a double annulus 33, the ends 34 of which may be secured by a suitable adhesive to the inner surface of its structure. Figure 13 shows a similar structure 35 the walls of which are much thinner than those of structure 33 of Figure 12. The two annuli of structure 35 consist preferably of a plurality of turns as shown in the drawing. The ends 34 of the double annulus may again be secured by a suitable adhesive to the innermost surface of the structure. Figure 14 shows a double-spiral member consisting of two spirals of the type shown in Figure 8, connected by and integral with a common portion 36.

Structures of the type illustrated in Figures 12 to 14 may be produced in accordance with the invention as follows. Figure 15 shows an arrangement generally similar to that described with reference to Figures 3 and 10. Lumber blank 39 is worked upon by a reciprocating plane 41 provided with two knifes 43a and 43b removed from each by a suitable substantial distance and so arranged as to include a suitable angle with the top surface of blank 39 as described in detail in said application Serial Number 59,544. Knife 43a will cut when plane 41 moves from left to right and knife 43b will cut when plane 41 moves from right to left, as indicated by arrow 42. Blank 39 is so arranged with respect to plane 41 and knifes 43a and 43b that after a complete movement of plane 41 in one direction the respective cutting knife 43a or 43b has just reached the middle line 45 of blank 39. In this manner structures having the shapes shown in Figures 12 to 14 may be produced, depending on the special construction of each knife, the length of the individual cutting cycles, the wall thickness of the structures cut etc. When structures of the type illustrated in Figures 12 and 13 are desired, the two small surfaces of blank 39 may be coated with an adhesive layer 40 to permit the cementing of ends 34 as previously indicated. Adhesive layers 40 may be omitted in the production of double spirals of the type of Figure 14. Ends 34 coated with adhesive as described may be cemented to the inner surface of the structures by high-frequency heating or other suitable conventional heating means.

The foregoing description and specific examples have served to illustrate preferred embodiments of the invention but are not intended to be limiting in scope. Other modifications may appear to those skilled in the art without deviating from the spirit and scope of the invention.

This application is a continuation in part of my co-pending application Serial No. 34,471 (Door Structures).

Having thus described the invention, what is claimed as new and desired to be secured by Letters Patent, is:

1. A process of producing spiral-shaped band-like bodies which comprises coating two parallel surfaces of a block of a material workable by a plane, with an adhesive, planing said block along a surface forming an angle with said parallel surfaces and over the entire width of said last named surface including said adhesive applied to said parallel surfaces, and forming in the course of said planing a spiral-shaped shaving the spiral edges of which are coated by said adhesive.

2. A process of producing spiral-shaped band-like bodies, which comprises cutting grooves into at least one surface of a block of planable material through the edge formed by said surface and a surface of said block forming an angle with said first-named surface, planing said block along said angle-forming surface including said edge, and forming in the course of said planing a spiral-shaped shaving having in its spiral-shaped edge corresponding to said first-named edge notches corresponding to said grooves.

3. A method of producing a spiral-shaped band-like body, which comprises planing a surface of a block of planable material by two immediately successive strokes conducted along the same straight line in opposite convergent directions, each of said strokes being a cutting stroke, forming a spiral-shaped partial shaving by the first stroke, terminating said first stroke before said spiral partial shaving is completely detached from said surface, conducting the second stroke in the opposite direction toward the point of termination of said first stroke, forming a second spiral-shaped partial shaving by said second stroke, carrying said second stroke at least to said termination point, and separating from said surface by completion of said second stroke a complete integral shaving consisting of said two partial shavings having opposite spiral turns and a portion connecting said spiral partial shavings.

4. The method of claim 3 which comprises coating two parallel surfaces of said block which are transverse to the surface being planed and to the direction of said strokes with an adhesive.

References Cited in the file of this patent

UNITED STATES PATENTS

| Number | Name | Date |
| --- | --- | --- |
| 412,507 | Hurford | Oct. 8, 1889 |
| 558,739 | Pickering | Apr. 21, 1896 |
| 2,083,165 | Harrap | June 8, 1937 |
| 2,171,358 | Gall | Aug. 29, 1939 |
| 2,192,101 | Peskin | Feb. 27, 1940 |
| 2,200,650 | Welch | May 14, 1940 |
| 2,261,264 | Luty | Nov. 4, 1941 |
| 2,288,104 | Pasquier | June 30, 1942 |
| 2,385,352 | Davis | Sept. 25, 1945 |
| 2,538,330 | Rosenhagen | Jan. 16, 1951 |

FOREIGN PATENTS

| Number | Country | Date |
| --- | --- | --- |
| 835,092 | France | 1938 |
| 538,306 | Great Britain | 1941 |